Figure 4:
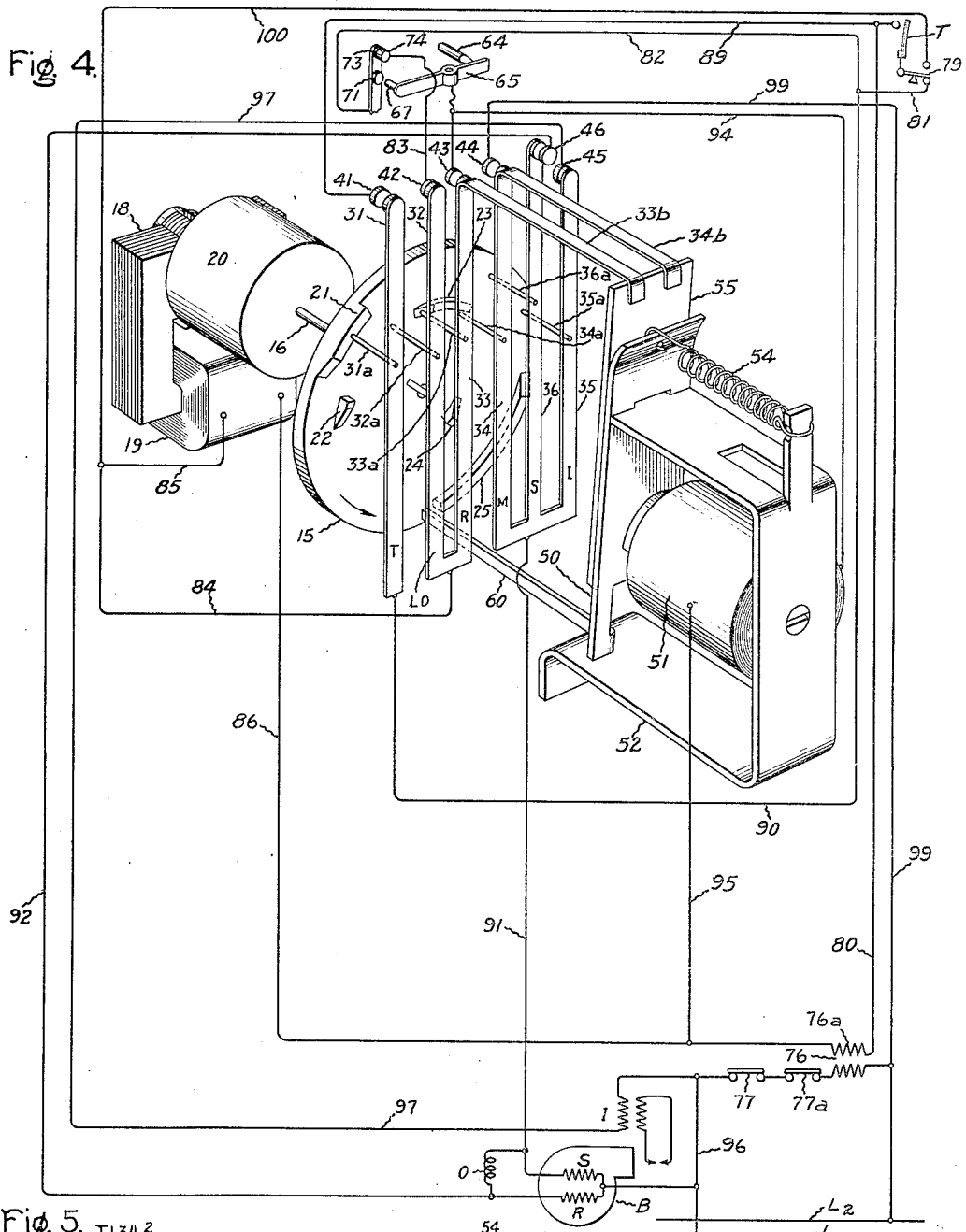

July 27, 1943.  G. R. TOWNSEND  2,325,440
SEQUENTIAL CONTROL SYSTEM AND APPARATUS
Filed Oct. 1, 1941  2 Sheets-Sheet 1
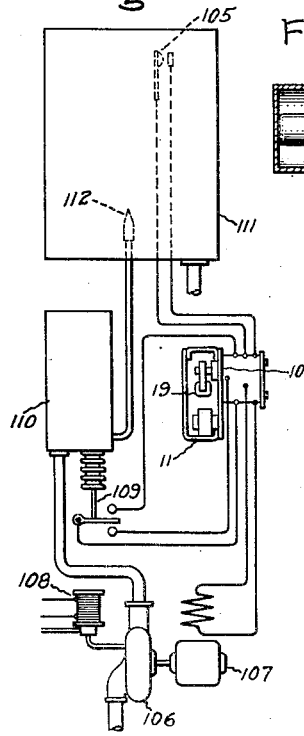
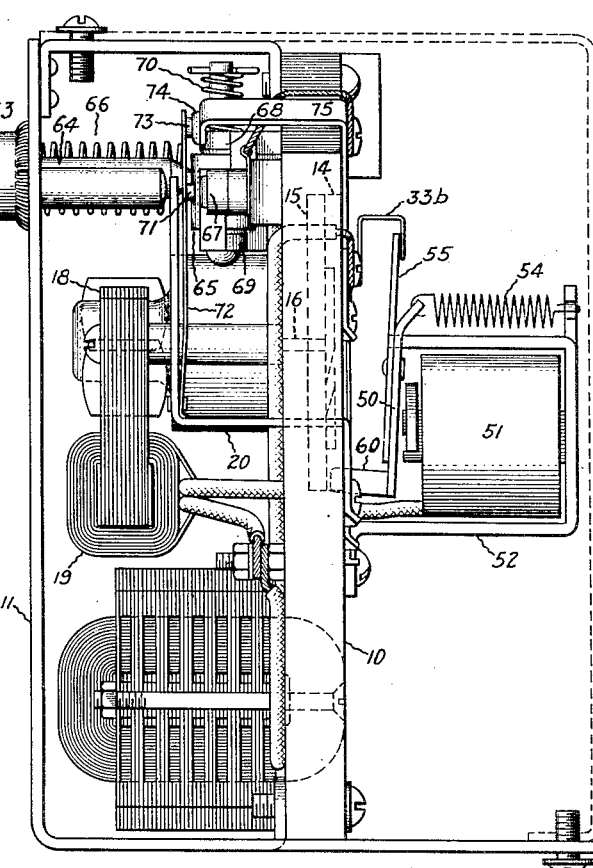
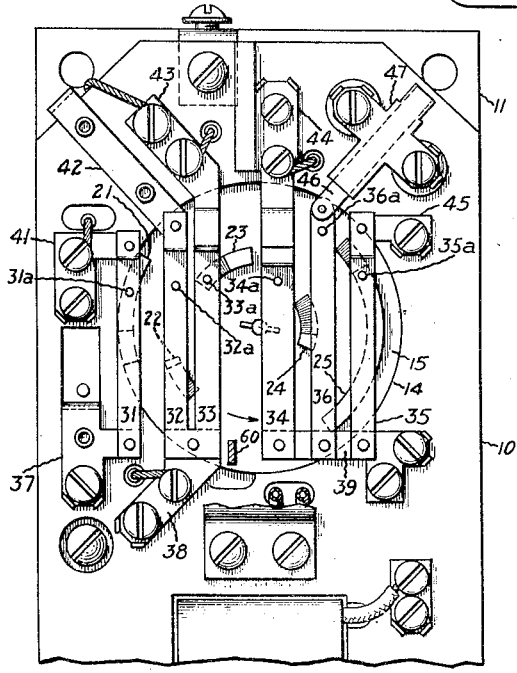
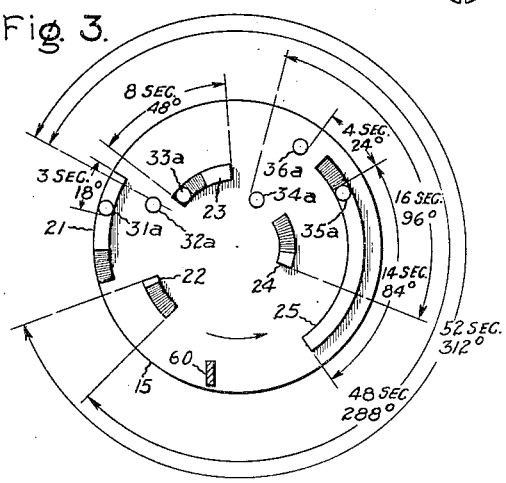
Inventor:
George R. Townsend,
by Harry E. Dunham
His Attorney.

Inventor:
George R. Townsend,
by Harry E. Dunham
His Attorney.

Patented July 27, 1943

2,325,440

UNITED STATES PATENT OFFICE 2,325,440

SEQUENTIAL CONTROL SYSTEM AND APPARATUS

George R. Townsend, Schenectady, N. Y., assignor to General Electric Company, a corporation of New York Application October 1, 1941, Serial No. 413,185

20 Claims. (Cl. 158—28)

The invention relates to sequential control systems and apparatus and provides improvements therein that are of particular advantage in the automatic control of condition changing apparatus involving a sequence of control conditions wherein the automatic establishment of one condition is a prerequisite for controlling another condition.

The improvements of the present invention are of special advantage in automatically controlling oil burners or the like to establish and maintain combustion properly so as to provide for automatic thermostatic heating control. However, the improved control combinations of the present invention may be used with advantage in other sequential control systems and apparatus where the automatic control of some desired condition corresponding to house temperature or the like is dependent upon the proper automatic establishment of a prerequisite condition corresponding to establishment of combustion by the burner mechanism or the like.

The principal object is to provide an improved combination of sequential timing control elements with a holding electromagnet having a magnetic member biased out of attractive relation therewith for coordinating and interrelating the selective control functions of various automatic condition responsive elements in the automatic control of a condition changing device such, for example, as an automatic burner or the like so as to effect automatic operation of such device only under proper conditions.

A special object is to provide for mechanical operation of the magnetic member of the holding electromagnet by the timing control during its sequential timing operation in conjunction with selective means for controlling the energization of the holding electromagnet. In the preferred form of the invention, one of the selective energization control means is operated by the sequential timing control to energize the electromagnet for a limited interval and the other means is under the control of a condition responsive device so as to maintain the electromagnet energized thereafter in case the condition is established during said interval.

A more specific object is to provide an improved burner control having an electric motor driven sequential timing cam switch mechanism with a biased magnetic member operated in the sequence and having a holding electromagnet cooperating therewith in starting burner operation and connected and arranged so that said electromagnet is maintained energized thereafter under the control of a combustion responsive switch to continue operation of the burner.

Figure 5:
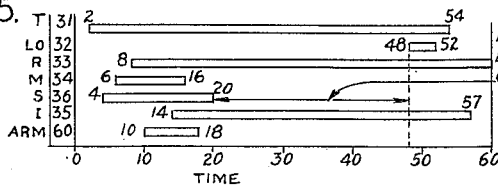

Other objects and advantages of the present invention will become apparent in the course of the following description of the accompanying drawings in which Fig. 1 is a side view of an electric timing motor driven sequential cam operated switch mechanism embodying the improvements of the present invention in a preferred form and particularly adapted for oil burner control; Fig. 2 is a front view of the improved oil burner control apparatus shown in Fig. 1 with certain parts broken away more clearly to reveal the sequentially operated switches; Fig. 3 is a schematic timing cam sequence diagram showing the relative times required for the various control operations performed by the apparatus shown in Figs. 1 and 2; Fig. 4 is a schematic diagram showing the circuit connection of the sequencing control apparatus of Figs. 1 and 2 for typical oil burner control service; Fig. 5 is a sequence chart of the burner control shown in Fig. 4 and Fig. 6 is a schematic circuit diagram illustrating the sequential control apparatus of Fig. 1 in prerequisite condition control service in connection with a humidifying apparatus.

As shown in Fig. 1, all of the principal parts of the improved sequential timing control mechanism are mounted upon a base plate 10, preferably formed of moulded electrical insulating material. The insulating base plate 10 in turn is mounted upon an L-shaped mounting bracket 11 which preferably engages with a suitable removable cover indicated by the dotted lines in order to completely enclose all of the operating parts of the control. The insulating base 10 is provided with a circular recess 14 within which the rotatable sequence control cam disc 15 is fixedly mounted on the shaft 16 of the timing control motor 18. The timing control motor 18 is shown as of the synchronous alternating current type having an energizing winding 19 with the rotatable armature and speed reducing gearing all mounted within the enclosing cylinder 20 from which the timing shaft 16 extends.

The sequential control cam disc 15 is, as shown more clearly in Fig. 4, provided with a plurality of cams 21 to 25 extending in an axial direction from the face of the disc 15 for movement in circular paths of different radii. These cams 21 to 25 operate respectively in a predetermined timed sequence a plurality of movable switch members 31 to 36 as shown in Fig. 2, the single cam 25 operating both switch members 35 and 36. These movable switch members 31 to 36 are formed of resilient strips mounted at their lower ends on suitably formed terminal connection pieces 37, 38 and 39 so that all the switch members are disposed in spaced apart substantially parallel relation with the cam disc 15. As shown in Fig. 3, each of the movable switch members 31 to 36 carries its own operating pin or finger 31a to 36a which is disposed in the circular path of movement of the corresponding operating cam 21 to 25.

Each of the movable switch members 31 to 35 is biased by its mounting into circuit closing engagement with its corresponding coperating stationary switch member 41 to 45. These stationary members are all mounted on the insulating base 10 around the periphery of the circular recess 14 as shown in Fig. 2. The movable switch member 36, however, is biased out of engagement with its cooperating stationary switch member 46 which is resiliently mounted upon the terminal support 47.

As shown more clearly in Fig. 4, the movable switch members 33 and 34 are under the joint control of the corresponding cams 23 and 24 that effect the sequential operation thereof and the movable magnetic member 50 of the electromagnet 51 that effects the simultaneous operation of switch members 33 and 34 on deenergization of the electromagnet 51. Movable magnetic member 50 is pivotally mounted upon the magnetic frame 52 and is biased by the spring 54 to carry the electrical insulating strip 55 into engagement with the bent-over ends of the arms 33b and 34b extending from the top of the switch members 33 and 34. In this way the switch members 33 and 34 are predominantly biased by the spring 54 out of engagement with their cooperating stationary switch members 43 and 44. Thus, whenever the magnetic member 50 is released from its attracted position by deenergization of the magnet 51, the switch members 33 and 34 will at once be disengaged from their coperating stationary switch members 43 and 44 independently of any action of the sequence timing cam 15.

In accordance with the present invention the magnetic armature 50 is arranged to be mechanically operated into its attracted position by the cam 21 carried by the rotating cam member 15 so as to release the switch members 33 and 34 for sequential control by the timing cam 15. This is accomplished through the agency of the bent-over finger 60 which extends from the lower end of the magnetic member 50 adjacent to the face of cam disc 15 so as to be located in the path of the cam 21.

An overlapping contact type of combustion-responsive device is combined with the approved oil burner control. As shown in Fig. 1 this combustion responsive device comprises a tube 62 which expands when subjected to the heat of combustion and a rod 63 formed of relatively inexpansive material such as quartz or a suitable ceramic material. The rod 63 is in operative relation with a plunger 64. A pivoted switch operating member 65 is biased by the spring 66 into engagement with the plunger 64. The movable switch contact 67 is operated by the pivoted switch operating arm 65 through the agency of the friction clutch members 68 and 69 which are biased into frictional engagement with the switch operating member 65 by the compression spring 70. The movable flame-responsive switch contact 67 engages with the contact 71 carried on the flexible strip 72. The flexible strip 72 also carries the switch contact 73 which is normally biased by the strip into engagement with the cooperating switch contact 74 carried on the terminal strip 75.

Referring to Fig. 4, all of the parts are shown schematically connected to control the operation of an oil burner mechanism indicated schematically at B. This burner mechanism is operated by an electric motor having a running winding indicated at R and a starting winding indicated at S. Also, a burner ignition transformer I is provided to establish an arc across the ignition electrodes in order to initiate combustion. The operating winding O of an electromagnetically operated burner oil flow control valve is indicated schematically in the drawings.

Electric power is supplied to operate the various burner elements from the supply lines indicated as $L_1$ and $L_2$. A control transformer 76 is employed to supply from its low voltage secondary 76a all the control circuits of the oil burner apparatus. The usual safety limit switches 77 and 77a are shown connected in the primary circuit of the transformer 76 and may be arranged to open this circuit upon the occurrence of various abnormal burner conditions such as excessive pressure or low water in case the burner is operated with a boiler furnace or excessive temperature in the case of a warm air furnace.

*Operation*

The operation of the improved oil burner control shown in Fig. 4 is as follows. The starting of the burner is under the control of an automatic condition responsive switch indicated schematically in the drawings as the room thermostat T but may be any other suitable automatic switch. Upon the closure of the thermostatic switch T, an energizing circuit for the operating winding 19 of the sequence timing motor 18 is established. This circuit may be traced from the transformer low voltage secondary 76a through the conductor 80, the thermostat T in its closed position, conductors 81, 82, contacts 73, 74 of the flame responsive switch in their closed position, conductor 83, switch members 42 and 32, conductor 84 and thence through conductor 85, timing motor winding 19 and conductor 86. Upon energization thereof, the timing motor 18 starts rotation of the sequence timing cam disc 15 in the counterclockwise direction from its initial or start position in which it is shown. Thereupon the sequence of events indicated schematically in Fig. 5 is started.

As indicated in the sequence chart of Fig. 5 a complete revolution of the timing cam disc 15 is produced in a period of 60 seconds. At the start, switch 31 is blocked in the open position by cam 21, and also switch 33 by cam 23, and switch 35 by cam 25. After the first two seconds of operation the pin 31a drops off the face of cam 21, thereby permitting the switch member 31 to engage its cooperating switch member 41 in accordance with its bias. This completes a shunt circuit around the thermostatic switch T so as to insure continued energization of the timing motor winding independently of the switch T. The shunt circuit around switch T extending through conductors 89 and 90. After four seconds rotation of disc 15, cam 25 engages with pin 36a so as to close the normally open switch member 36. This serves to connect the starting winding S directly in parallel circuit with the running winding R through the conductors 91 and 92 and also serves to short circuit the oil flow valve operating winding O.

After six seconds of operation of the timing disc 15, cam 24 engages with finger 34a so as to mechanically block the main burner switch member 34 in the open position. After eight seconds of operation of the timing disc 15, the pin 33a runs off the end of the cam 23, thereby removing the mechanical blocking of switch 33 in the open position. But switch 33 remains held in the open position by the spring 54 operating through armature 50 and strip 55. In ten seconds of operation of the timing disc 15, the cam 21 is carried into engagement with the arm 60 so as mechanically to operate the magnetic armature 50 to its attracted position. This moves the insulating member 55 out of engagement with the bent-over ends of the arms 33b and 34b. This in turn permits control switch 33 to close. But the main burner switch 34 is at this time still mechanically blocked open by the cam 24.

The closure of control switch 33 completes an energizing circuit for the winding of electromagnet 51, this circuit extending from the transformer secondary 76a through conductors 80, 82, flame responsive switch contacts 73, 74, conductors 83, switch members 42, 32, 33 and 43, and thence through conductor 94 and the operating winding of electromagnet 51 and conductor 95 to the other side of the transformer winding. As a result the magnetic armature 50 is held magnetically in its attracted position.

At the fourteen second interval, finger 35a drops off of cam 25 so as to permit switch member 35 to engage cooperating switch member 45 and thereby partially complete the energizing circuit for the primary winding of the ignition transformer I, the circuit extending from the supply line L₁ through conductors 96, 97, switch members 45, 35. Thus, after the fourteen second interval both the ignition transformer I and the running and starting winding of the burner motor will be energized upon closure of the switch member 34 when the pin 34a drops off of the cam 24 at the sixteen second interval. Such closure of switch 34 establishes a circuit from the switch members 35, 36 through the switch members 34, 44, and conductor 99 to the supply line L₂. This energizes the transformer I and produces an arc at the electrodes of the ignition transformer and also starts operation of the motor driven mechanism by energizing both starting and running windings. However, the oil valve operating winding O remains short circuited. Hence no oil is supplied to the burner, thereby preventing establishment of combustion. The short circuit of the oil valve winding O is removed when the pin 36a drops off of the cam 25 at the 20 second interval. Thereupon switch 36 returns to its open position, thereby deenergizing the starting winding of the motor which is only necessary during the starting period and energizing the oil valve winding O by the voltage induced in starting winding S. This results in opening of the oil valve and under normal conditions the oil will be ignited to establish combustion.

As soon as combustion is established, the flame responsive device operates the pivoted switch arm 65 to engage contact 67 with contact 71 and thereby move contact 73 out of engagement with contact 74. Thereupon an energizing circuit of the operating winding of the electromagnet 51 in parallel with the initial energizing circuit through the switch member 33 is established. This parallel circuit extends from the conductor 94 through the switch member 67, 71, conductor 82, the reset switch 79, room thermostat T and conductor 80. This parallel energizing circuit is independent of the lock out switch member 32 so that as long as combustion continues through the time interval 48 seconds to 52 seconds, during which lock-out switch 32 is opened as indicated in Fig. 4, no lock-out of the control will occur. Thus the parallel energizing circuits of electromagnet 51 are provided for controlling the energization thereof in overlapping sequence so that in case combustion does not continue during this 48-52 second interval, then the flame detector switch contact 67 will no longer be in engagement with contact 71 and switch member 32 no longer will be in engagement with switch contact 42. Consequently the magnet 51 will be deenergized, thereby releasing the magnetic member 50 for operation by the biasing spring 54 to open both switch members 33 and 34. This results in deenergizing all of the burner circuits as well as all of the control circuits thereby stopping the timing motor 18.

Upon the occurrence of lock-out as just described, the reset switch 79 must be manually operated from the position in which it is shown to the position in which conductor 100 is energized. This provides an independent energizing circuit for the timing motor 18 so as to rotate the disc 15 until the lock-out cam 22 is moved away from the pin 32a so as to permit reclosure of the lock-out switch 32.

Assuming, however, that combustion was continued during the critical lock-out period 48-52 seconds, then at the 54 second interval cam 21 engages the finger 31a to open the switch 31 and thereby open the shunt circuit around the thermostatic switch T. The timing motor 18, however, remains energized through a circuit including the switch members 33 and 43, flame responsive contacts 67 and 71, conductor 82, reset switch 79 in the position shown, the thermostat T in its closed position and conductor 80. Therefore the timing motor 18 will be maintained energized until the switch 33 is open at the 60 second interval, thereby indicating that the timing disc 15 has made one complete revolution and returned to its initial position.

When the continued operation of the burner has raised the temperature to which the thermostat T responds to open its contacts, then the energizing circuit of electromagnet 51 is interrupted. This releases the magnetic member 50 so as to open the switch members 33 and 34 and thereby deenergize both the burner and the control apparatus with all parts returning to their initial positions in which they are shown.

The control is arranged to take care of voltage failure at any time during the starting period. In case the voltage failure should occur before the eighteen second period, the cycle will be completed in a normal manner upon return of normal voltage. In case the voltage failure occurs after the eighteen second interval, the timing motor 18 will simply operate the timing disc 15 to lockout without, however, energizing any of the burner apparatus due to the fact that both the switch members 33 and the switch members 34 will be maintained open since the operating winding of magnet 51 cannot be energized. This is due to the fact that the magnetic armature 50 must be mechanically operated to its attracted position during the ten to eighteen second period before the magnet 51 can be energizd thereafter.

In the modification shown in Fig. 6 the improved sequence control apparatus of the present invention is shown employed in a humidifying control system. In this system a humidity responsive device 105 is employed instead of the room thermostat to control the starting into operation of the system. The water supply pump 106 is driven by the motor 107 instead of the oil burner mechanism. The electromagnetically operated pump priming valve 108 is employed in place of the burner ignition system and the water pressure switch 109 is employed in place of the flame responsive switch. Otherwise the control system itself may be exactly the same as previously described.

In operation when the humidity responsive device 105 closes its contacts, the timing motor 18 is energized in exactly the same way as when the room thermostat closes its contacts. The sequencing switch mechanism then operates to energize the priming valve 108 and the operating winding of the pump driving motor 107 in the same sequence as the ignition and burner motor previously described. In case the pump 106 is sucessful in establishing a water pressure in the chamber 110, then the pressure switch moves its contact from the position in which it is shown to its other position in identically the same way as the flame responsive switch and the control thereupon continues operation of the pump motor 107 until the opening of the humidity responsive switch 105 due to the increase of humidity in the chamber 111 by the spraying of the water from the spray nozzle 112.

What I claim as new and desire to secure by Letters Patent of the United States is:

1. In combination, a control member having a bias to one position, a movable operating member having a stronger bias for operating said control member to another position, timing means for operating said operating member against its bias and for preventing the operation of said control member in accordance with its bias for a predetermined time after said operation of said operating member against its bias, an electromagnet for holding said operating member against its bias independently of said timing means, and means for energizing said electromagnet upon the operation of said operating member against its bias.

2. In a burner circuit control, the combination of a switch member biased to close the burner circuit, a movable operating member having a stronger bias for operating said switch member to open the burner circuit, a timing device having cam means for operating said operating member against its bias and for preventing the operation of said switch member in accordance with its bias for a predetermined time interval after said cam operation of said operating member against its bias, an electromagnet for holding said operating member against its bias independently of said cam means, and means for energizing said electromagnet upon said cam operation of said operating member.

3. In combination, a control member movable each way between two control positions, separate means for biasing said member to each of said positions, one of said biasing means being stronger than the other to predominately bias said member to one of said positions, sequential timing means for opposing said one biasing means for a limited period while preventing movement of said member by said other biasing means during the initial part of said period, and electroresponsive means energized upon movement of said member to said other position during the latter part of said period for opposing said stronger biasing means thereafter.

4. In combination, a movable magnetic member, means for biasing said magnetic member to one position, a timing device for mechanically moving said member against its bias to another position, an electromagnet for holding said member in said other position independently of said timing means, a switch controlling the energization of said electromagnet, said switch being under the joint control of said movable magnetic member and said timing device to be closed upon movement of said magnetic member to said other position and opened by said timing device a time interval thereafter, and means including a condition responsive switch for maintaining said electromagnet energized after said first said switch opens.

5. In combination, electrically operated conditioning means, a main control switch therefor, means for biasing said switch to the circuit closing position, means including a timing device for preventing closure of said switch during a predetermined interval, and means for sequentially controlling closure of said switch including an electromagnet having a movable magnetic member mechanically operated by said timing device during said interval, and parallel circuits controlling the energization of said electromagnet one including an auxiliary switch opened by said timer and the other a condition responsive switch.

6. In combination, a timing device having sequentially operated circuit control elements, a movable magnetic member biased to effect simultaneous operation of a plurality of said elements and moved against its bias by said timing device, an electromagnet for holding said member upon operation thereof by said timing device, and parallel circuits for energizing said electromagnet one including one of said elements controlled by said magnetic member, and the other a condition responsive switch.

7. In combination, a control member movable between two control positions, means biasing said member to one of said positions, means including a timing device for preventing movement of said member to said one position during a predetermined interval, a movable magnetic member biased to effect movement of said control member to the other of said control positions, and means operated by said timing device for moving said magnetic member against its bias during said interval, an electromagnet for holding said magnetic member against its bias, and parallel circuits for energizing said electromagnet, one including a switch jointly controlled by said timing device and said magnetic member and the other a condition responsive switch.

8. In a burner control system, a burner control switch biased closed to effect operation of the burner, a movable magnetic member biased to open said burner switch, a timing device having means for preventing closure of said burner switch for a predetermined interval and means for operating said magnetic member against its bias during said interval, an electromagnet for holding said magnetic member against its bias after said interval, and a pair of energization control switches for said magnet, the first closed by said timer for a second interval overlapping said first interval, and the second normally closed by a condition responsive device during said second interval, and a lockout switch operated by said timer during said second interval for de-energizing both said timing device and said electromagnet upon failure of said second switch to close.

9. In combination, an electrically operated burner, a burner circuit control switch biased closed, a magnetic member biased to open said switch, an electromagnet for holding said magnetic member upon movement thereof against its bias, parallel circuits for energizing said electromagnet, one including a burner combustion responsive switch, and means including a timing device for mechanically moving said magnetic member against its bias for an interval and for closing the other of said parallel energizing circuits for another interval to start operation of said burner.

10. In a burner control system, in combination a burner circuit control switch biased to the circuit closing position, a magnetic member biased to open said switch, an electromagnet for holding said magnetic member upon movement thereof against its bias, said electromagnet being incapable of moving said member against its bias, parallel circuits for energizing said electromagnet, one including a burner combustion responsive switch, and means including a timing device for mechanically moving said magnetic member against its bias for an interval and for closing the other of said parallel energizing circuits for another interval to start operation of the burner.

11. In combination, an electrically operated burner, a burner combustion responsive switch having overlapping circuit opening and circuit closing contacts, a burner circuit control switch, a magnetic member biased to open said switch, an electromagnet for holding said magnetic member upon movement thereof against its bias, parallel circuits for energizing said electromagnet, one including said circuit opening contact and the other said circuit closing contact, and means including a timing device for mechanically moving said magnetic member against its bias and for closing said one parallel circuit for a limited interval to start operation of said burner.

12. In combination, an electrically operated burner, a burner combustion responsive switch having overlapping circuit opening and circuit closing contacts, a burner circuit control switch, a magnetic member biased to open said switch, an electromagnet for holding said magnetic member upon movement thereof against its bias, parallel circuits for energizing said electromagnet, the first including said circuit opening contact and the second said circuit closing contact, and means including a timing device having an initial energizing circuit including said circuit opening contact for mechanically moving said magnetic member against its bias for an interval and for closing the second of said parallel circuits for another interval to start operation of said burner, and a lockout switch included in said energizing circuit for said timing device and in said first parallel circuit and operable by said timing device near the end of said other interval to prevent further energization of said timing device and said electromagnet upon failure of said combustion responsive switch to respond during said other interval.

13. In combination, a rotatable disc having a plurality of cams extending axially from the face of said disc, a plurality of movable circuit controlling members, each having an operating element disposed in the path of a corresponding one of said cams to effect operation thereof, an electromagnet having a movable magnetic member biased to move the operating elements of a plurality of said circuit controlling members out of the path of the corresponding cams, said magnetic member having operating elements disposed in the path of another of said cams for operating said member against its bias into attractive relation with said electromagnet, and means for controlling energization of said electromagnet including one of said circuit controlling members controlled by said magnetic member.

14. In combination, a sequential circuit controlling device having a rotatable disc provided with a plurality of cams on the face thereof for movement in circular paths of different radii, an electric timing motor for rotating said disc, a plurality of movable switch members, each having an operating element disposed in the path of movement of a corresponding one of said cams to effect operation of said switch members in timed sequence, a movable magnetic member biased to move the operating elements of a pair of said switch members out of the path of the corresponding cams, said magnetic member having an operating element disposed in the path of another of said cams for operating said magnetic member against its bias, an electromagnet for holding said magnetic member upon operation thereof against its bias, means for controlling energization of said electromagnet including one of said pair of switch members, and means for controlling energization of said timing motor including a different one of said switch members.

15. In combination, a rotatable disc provided with a plurality of cams on the face thereof for rotation in circular paths of different radii, a plurality of movable switch members disposed in substantially parallel spaced apart relation with the face of said disc each having an operating element extending toward said disc and disposed at a different radii for operation by a corresponding one of said cams, a movable magnetic member having means for operating a pair of said switch members and biased to move the cam operating elements of said pair of switch members out of the paths of the corresponding cams, said magnetic member having an operating element disposed in the path of another of said cams for operating said magnetic member against its bias, parallel circuits for controlling energization of said electromagnet, one including one of said pair of switch members and the other a condition responsive device, an electric motor for rotating said disc, parallel circuits for controlling energization of said motor, one including a different one of said switch members and the other a condition responsive device.

16. In combination with an oil burner having an electric driving motor and an electrically controlled igniter, of a sequential cam operated circuit controlling switch mechanism having an electric timing motor and an electromagnet provided with a movable magnetic member having biasing means for preventing operation of said magnetic member by said electromagnet and mechanically operated by said timing motor against said biasing means and cooperating with said switch mechanism for effecting energization of said burner driving motor and igniter to attempt to establish combustion during a limited time interval, means including a combustion responsive switch and a thermostatic switch for controlling the energization of said sequential switch mechanism driving motor and said electromagnet during said interval, and connections whereby upon establishment of combustion said combustion responsive switch and said thermostatic switch maintains said electromagnet energized to maintain said burner driving motor in operation independently of said sequential circuit controlling switch mechanism until either combustion fails, the thermostatic switch operates, or voltage fails.

17. In combination with a burner having a plurality of electrically controlled elements jointly operable for establishing combustion, of means including a master control and an electric timing motor driven sequential cam operated circuit controlling switch mechanism having the timing motor energized in an initial position under the control of said master control switch to operate said sequential circuit control switch mechanism from an initial position through a cycle for effecting operation of said burner element in a predetermined timed sequence providing a limited period of joint operation thereof to establish combustion, and means including an electromagnet initially energized under the control of said switch mechanism and having a movable magnetic member biased to effect operation of said sequential switch mechanism to deenergize said electrically controlled burner elements and mechanically operated against its bias by said timing motor during said cycle and a combustion responsive means effective upon establishment of combustion during said cycle to maintain said electromagnet energized to continue energization of said burner element independently of said sequential switch mechanism.

18. In combination, a timing device having a plurality of circuit controlling contacts and means for sequentially operating said contacts, an electromagnet having a movable magnetic member controlled thereby in one position and provided with means for simultaneously operating a pair of said contacts upon movement from said position, said member having means mechanically operated by said timing device for moving said magnetic member to said one position, and parallel circuits for sequentially controlling energization of said electromagnet to hold said magnetic member in said one position, one of said circuits including one of said pair of contacts and the other of said circuits including a condition responsive circuit controlling device.

19. In combination, a timing device having a plurality of control elements operated thereby in a timed sequence, an electromagnet having a movable magnetic member biased out of attractive relation and provided with means effective upon movement of said member in accordance with its bias for simultaneously operating a pair of said elements and provided with means mechanically operated by said timing device for moving said magnetic member into attractive relation with said electromagnet for rendering said simultaneous operating means inactive, and parallel circuits for sequentially controlling energization of said electromagnet to hold said magnetic member in attractive relation therewith, one of said circuits including one of said pair of control elements and the other of said circuits including a condition responsive circuit controlling device.

20. In combination, a two position main control switch, opposing biasing means therefor, a timing device having a cam for temporarily blocking operation of said switch to one position, a magnetic member for controlling said biasing means and movable by said timing device temporarily to a corresponding position to bias said main control switch to move to said one position under control of said cam, an electromagnet for holding said magnetic member in said corresponding position and having an energizing circuit including an auxiliary switch closed in response to movement of said magnetic member to said corresponding position and thereafter opened by said timer, and means including a condition responsive switch for controlling said energizing circuit in parallel with said auxiliary switch.

GEORGE R. TOWNSEND.